(12) United States Patent
Procopio

(10) Patent No.: US 9,390,141 B2
(45) Date of Patent: Jul. 12, 2016

(54) SYSTEMS AND METHODS FOR DETERMINING APPLICATION INSTALLATION LIKELIHOOD BASED ON PROBABILISTIC COMBINATION OF SUBORDINATE METHODS

(71) Applicant: Google Inc., Mountain View, CA (US)

(72) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 250 days.

(21) Appl. No.: 14/040,782

(22) Filed: Sep. 30, 2013

(65) Prior Publication Data

US 2015/0095321 A1   Apr. 2, 2015

(51) Int. Cl.
*G06F 17/30* (2006.01)
*G06F 9/445* (2006.01)

(52) U.S. Cl.
CPC .............. *G06F 17/3053* (2013.01); *G06F 8/61* (2013.01)

(58) Field of Classification Search
CPC ...................................................... G06F 17/30
See application file for complete search history.

(56) References Cited

U.S. PATENT DOCUMENTS

| | | | |
|---|---|---|---|
| 7,617,519 B2 | 11/2009 | Williams | |
| 8,452,797 B1 * | 5/2013 | Paleja et al. | 707/767 |
| 8,468,164 B1 | 6/2013 | Paleja et al. | |
| 8,612,470 B1 * | 12/2013 | Fushman et al. | 707/767 |
| 2006/0136389 A1 | 6/2006 | Cover et al. | |
| 2007/0060099 A1 | 3/2007 | Ramer et al. | |
| 2009/0006398 A1 * | 1/2009 | Lam et al. | 707/7 |
| 2009/0106314 A1 | 4/2009 | Song et al. | |
| 2009/0259998 A1 | 10/2009 | Bergman et al. | |
| 2010/0042608 A1 * | 2/2010 | Kane, Jr. | 707/5 |
| 2010/0094878 A1 | 4/2010 | Soroca et al. | |
| 2010/0250337 A1 | 9/2010 | Kassaei | |
| 2011/0153853 A1 | 6/2011 | London et al. | |
| 2011/0307354 A1 * | 12/2011 | Erman et al. | 705/27.1 |

(Continued)

FOREIGN PATENT DOCUMENTS

| | | |
|---|---|---|
| KR | 2003-0016494 | 3/2003 |
| WO | WO 2013/062546 | 5/2013 |
| WO | WO 2014/036936 | 3/2014 |

OTHER PUBLICATIONS

International Search Report and Written Opinion for Application No. PCT/US2014/053012, dated Nov. 27, 2014, 10 pages.

(Continued)

*Primary Examiner* — Khanh Pham
(74) *Attorney, Agent, or Firm* — Ropes & Gray LLP

(57) ABSTRACT

A method for providing a scored list of applications for use in recommending applications to a user includes receiving at a cloud computing service a request to provide a composite scored list of applications for a user, where the cloud computing service provides a set of available applications to each user and receives input data for determining the composite scored list of applications. The cloud computing service initializes a plurality of independent scorers, which each take as input a portion of the input data and outputs a scored list of applications, and normalizes the scored list of applications outputted by each independent scorer. The cloud computing service constructs the composite scored list of applications, where the composite scored list of applications is a function of the normalized scored list of applications and a weighting value assigned to each independent scorer, and outputs the composite scored list of applications.

32 Claims, 6 Drawing Sheets

(56) References Cited

U.S. PATENT DOCUMENTS

| | | |
|---|---|---|
| 2012/0072283 A1* | 3/2012 | DeVore et al. .............. 705/14.49 |
| 2012/0084292 A1 | 4/2012 | Liang et al. |
| 2012/0096435 A1 | 4/2012 | Manolescu et al. |
| 2012/0179973 A1* | 7/2012 | Brolley et al. ................ 715/738 |
| 2012/0215684 A1 | 8/2012 | Kidron |
| 2012/0303477 A1 | 11/2012 | Ben-Itzhak |
| 2013/0086553 A1 | 4/2013 | Grechanik |
| 2013/0103758 A1 | 4/2013 | Alison et al. |
| 2013/0132896 A1 | 5/2013 | Lee et al. |
| 2013/0138674 A1 | 5/2013 | Jeong et al. |
| 2013/0166357 A1 | 6/2013 | Eggs et al. |
| 2013/0173637 A1 | 7/2013 | Kim et al. |
| 2013/0185292 A1 | 7/2013 | Li et al. |
| 2013/0185294 A1 | 7/2013 | Kami |
| 2013/0198029 A1 | 8/2013 | Mowatt et al. |
| 2013/0198506 A1 | 8/2013 | Smith et al. |
| 2013/0282750 A1 | 10/2013 | Paul et al. |
| 2013/0311836 A1 | 11/2013 | Hurst et al. |
| 2014/0222952 A1 | 8/2014 | Suryavanshi et al. |

OTHER PUBLICATIONS

International Search Report and Written Opinion for Application No. PCT/US2014/053565 dated Dec. 2, 2014, 8 pages.
Han, et al., "Efficient Service Recommendation System for Cloud Computing Market", ICIS 2009, Nov. 24-26, pp. 839-845.
IBM Knowledge Center—Administering the Widget Container http://www-01.ibm.com/support/knowledgecenter/SSYGQH_5.0.0/admin/admin/t_admin_common_widget_cocontain.dita?lang=en, retrieved Sep. 28, 2015, 2 pages.
IBM Knowledge Center—Managing images and videos for thumbnails and preview: http://www-01.ibm.com/support/knowledgecenter/api/content/nl/en-us/SSYGQH_5.0.0/admin/admin/t_admin_common_widget_container.dita, retrieved Sep. 28, 2015, 1 page.
MIME Types: http://www.sitepoint.com/web-foundations/mime-types-complete-list/, Apr. 15, 2014, 22 pages.
Su, et al., "A Survey of Collaborative Filtering Techniques," Advances in Artificial Intelligence, vol. 2009 Article ID 42425, Feb. 9, 2009, 19 pages.
Han, et al., "Efficient Service Recommendation System for Cloud Computing Marker", ICIS 2009, Nov. 24-26, 2009 pp. 839-845.

* cited by examiner

300

|       | Scorer 1 | Scorer 2 | Scorer 3 |
|-------|----------|----------|----------|
| App A | 923      | 0.2      | 0        |
| App B | 0        | 0.1      | 12.8     |
| App C | 1423     | 0.3      | 0        |
| App D | 745      | 0        | 0        |
| App E | 38       | 0.4      | 44.5     |

|       | Scorer 1 | Scorer 2 | Scorer 3 |
|-------|----------|----------|----------|
| App A | 0.29     | 0.2      | 0        |
| App B | 0        | 0.1      | 0.22     |
| App C | 0.45     | 0.3      | 0        |
| App D | 0.24     | 0        | 0        |
| App E | 0.01     | 0.4      | 0.78     |

FIG. 4

SYSTEMS AND METHODS FOR DETERMINING APPLICATION INSTALLATION LIKELIHOOD BASED ON PROBABILISTIC COMBINATION OF SUBORDINATE METHODS

BACKGROUND

Cloud computing services provide users with the ability to store, access, edit, and share electronic files using any electronic device capable of connecting to the cloud computing service over a remote network, such as the Internet. The files are stored on the cloud computing service rather than the user's electronic devices. The cloud computing service provides a user interface, for example through a web browser, for users to access and view the files. The files stored on cloud computing services may include word processing documents, spreadsheet files, presentation files, picture files, audio files, video files, and a number of other open or proprietary file formats.

A cloud computing service may be able to open many of the files that it stores through its user interface. However, cloud computing services may not be configured to open, display, or edit certain types of files, especially for some proprietary or less common file types. Cloud computing services may instead offer third-party applications to the user, where the third-party applications may be used to open certain files stored on the cloud computing service, as well as perform other functions. Third-party developers work with the cloud computing service to make the applications available to the user. Users may select and install an application to use in conjunction with, or separately from the cloud computing service. Cloud computing services may offer a large number of applications to users. Users may be overwhelmed with choices and may not be aware of certain applications that they may find useful. In addition, users may find it difficult to select between several similar applications, and also may not have the time to install many applications and test each one to find applications that they like.

SUMMARY

The systems and methods described herein provide ways to recommend applications offered by a cloud computing service to a user, where the recommendation is based on a composite score generated for each application provided by the cloud computing service. The composite score is built from a number of independent scorers which assign a score to each application based on a number of criteria. For example, one scorer may base the score on the application installation behavior of users of the cloud computing service. Another scorer may base the score on the application usage behavior of the users. The composite scorer receives input data that each independent scorer uses to calculate its score and passes the input data to each independent scorer. Each independent scorer has a weighting value. The composite score for an application is a function of the score for that application from each independent scorer, weighted by the weighting value of that scorer. The composite scored list of application is used to recommend applications to the user.

One aspect described herein discloses a method for providing a scored list of applications for use in recommending applications to a user, which includes receiving at a cloud computing service a request to provide a composite scored list of applications for a user, where the cloud computing service provides a set of available applications to each user of the cloud computing service, and receiving input data for determining the composite scored list of applications. The method further includes initializing a plurality of independent scorers, where each independent scorer takes as input a portion of the input data and outputs a scored list of applications for the set of available applications, and normalizing the scored list of applications outputted by each independent scorer. The method further includes constructing the composite scored list of applications, where the composite scored list of applications is a function of the normalized scored list of applications outputted by each independent scorer and a weighting value assigned to each independent scorer, and outputting the composite scored list of applications.

Another aspect described herein discloses an apparatus for providing recommendations for applications to a user, the apparatus including a server configured to communicate with the plurality of client computers and receive from a first client computer in the plurality of client computers a request to provide a composite scored list of applications for a user, where the server provides a set of available applications to each user of the server. The server is further configured to receive input data for determining the composite scored list of applications, and initialize a plurality of independent scorers, where each independent scorer takes as input a portion of the input data and outputs a scored list of applications for the set of available applications. The server is further configured to normalize the scored list of applications outputted by each independent scorer, construct the composite scored list of applications, where the composite scored list of applications is a function of the normalized scored list of applications outputted by each independent scorer and a weighting value assigned to each independent scorer, and output the composite scored list of applications.

Another aspect described herein discloses a non-transitory computer readable medium storing computer-executable instructions, which, when executed by a processor, cause the processor to carry out a method for providing a scored list of applications for use in recommending applications to a user. The non-transitory computer readable medium includes instructions to receive at a cloud computing service a request to provide a composite scored list of applications for a user, where the cloud computing service provides a set of available applications to each user of the cloud computing service, and instructions to receive input data for determining the composite scored list of applications. The non-transitory computer readable medium further includes instructions to initialize a plurality of independent scorers, where each independent scorer takes as input a portion of the input data and outputs a scored list of applications for the set of available applications, and instructions to normalize the scored list of applications outputted by each independent scorer. The non-transitory computer readable medium further includes instructions to construct the composite scored list of applications, where the composite scored list of applications is a function of the normalized scored list of applications outputted by each independent scorer and a weighting value assigned to each independent scorer, and instructions to output the composite scored list of applications.

Another aspect described herein discloses a system for providing recommendations for applications to a user, the system including a plurality of client computers and a server. The server is configured to communicate with the plurality of client computers and receive from a first client computer in the plurality of client computers a request to provide a composite scored list of applications for a user, where the server provides a set of available applications to each user of the server. The server is further configured to receive input data for determining the composite scored list of applications, and initialize a plurality of independent scorers, where each independent scorer takes as input a portion of the input data and outputs a scored list of applications for the set of available applications. The server is further configured to normalize the scored list of applications outputted by each independent scorer, construct the composite scored list of applications, where the composite scored list of applications is a function of the normalized scored list of applications outputted by each independent scorer and a weighting value assigned to each independent scorer, and output the composite scored list of applications.

BRIEF DESCRIPTION OF THE DRAWINGS

The methods and systems may be better understood from the following illustrative description with reference to the following drawings in which:

FIG. 3 shows an example of a plurality of scored list of applications outputted by independent scorers in accordance with an implementation as described herein;

FIG. 4 shows an example of a plurality of normalized scored list of applications in accordance with an implementation as described herein;

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing a way to recommend applications to a user, where the recommendation is based on a composite score generated for each application provided by the cloud computing service. The composite score is built from a number of independent scorers which assign a score to each application based on a number of criteria. For example, one scorer may base the score on the application installation behavior of users of the cloud computing service. Another scorer may base the score on the application usage behavior of the users. The composite scorer receives input data that each independent scorer uses to calculate its score and passes the input data to each independent scorer. Each independent scorer has a weighting value. The composite score for an application is a function of the score for that application from each independent scorer, weighted by the weighting value of that scorer. The composite scored list of application is used to recommend applications to the user.

Figure 1:
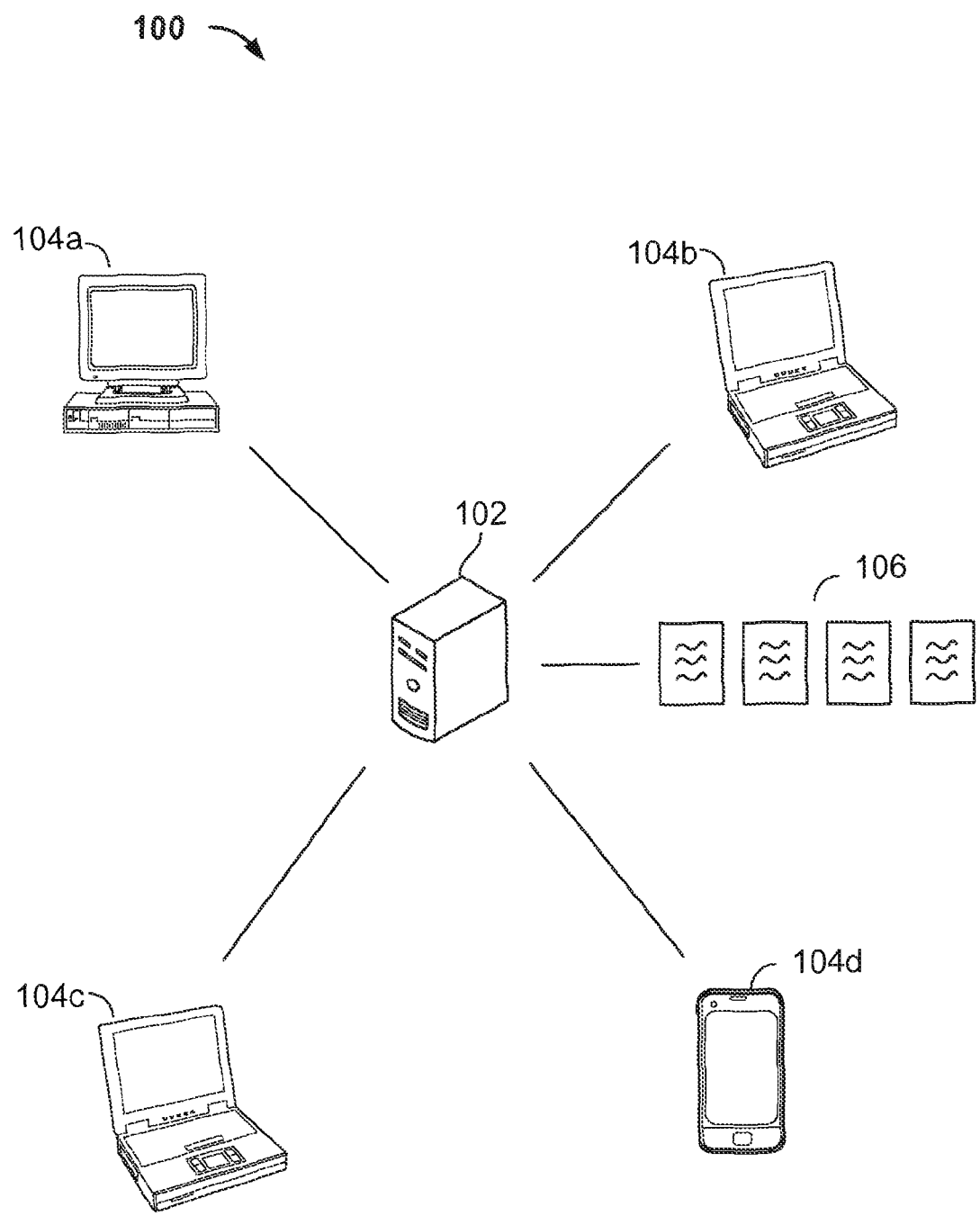
FIG. 1 shows a number of client computers in communication with a cloud computing service in accordance with an implementation as described herein.

First, a network system in which a number of client computers may connect to a cloud computing service is described. FIG. 1 shows a network system 100 that includes cloud computing service 102 and a number of client computers 104a through 104d. Cloud computing service 102 may include one or more servers that collectively provide cloud computing services for a number of client computers. Cloud computing service 102 stores a number of files accessible by client computers 104a-104d, such as files 106. Files 106 may include word processing documents, spreadsheets, presentations, images, audio files, video files, or any other files of various open or proprietary file types. Users may create, edit, copy, share, and delete files stored on cloud computing service 102. Client computers 104a-104d may include desktop computers, laptop computers, tablets, smart phones, mobile electronic devices, or any other device that may connect to cloud computing service 102 to view files 106. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
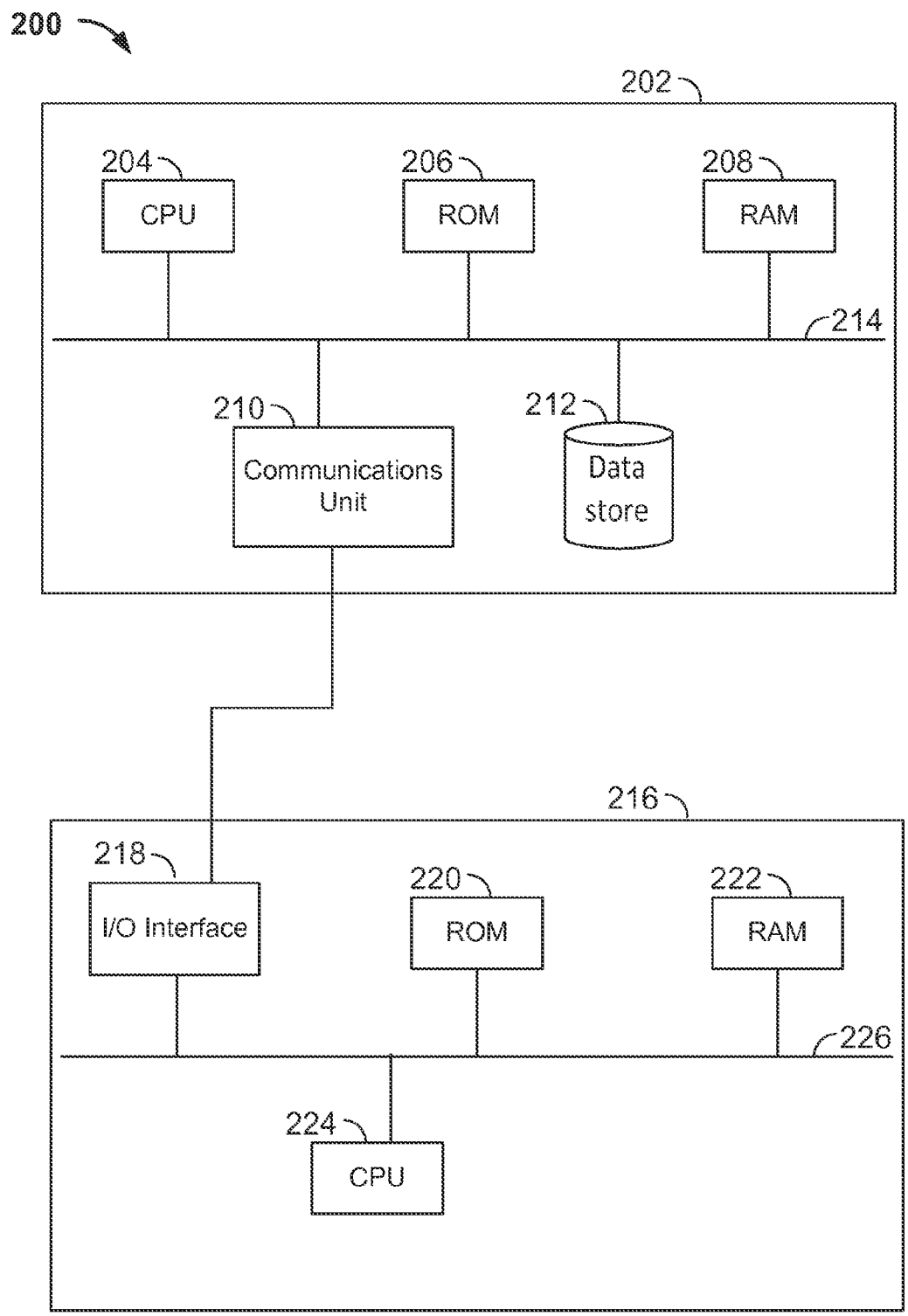
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 216. Cloud computing service 202 includes a central processing unit (CPU) 204, read-only memory (ROM) 206, random access memory (RAM) 208, communications unit 210, data store 212, and bus 214. Cloud computing service 202 may have additional components that are not illustrated in FIG. 2. Bus 214 allows the various components of cloud computing service 202 to communicate with each other. Communications unit 210 allows cloud computing service 202 to communicate with other devices, such as client computer 216 and other client computers. Data store 212 is used to store files accessible by a user on client computer 216. Users log on to the cloud computing service using a username and password, and cloud computing service 202 provides a user interface for the display of files through the web browsers executing on the client computers. Data store 212 may also store a number of applications that are made available to users for installation.

Data store 212 may also store metadata regarding files and users, and may store tables, matrices, files and other data structures based on the file and user metadata. The data structures may be used by cloud computing service 202 as input data to create scored list of applications for use in making application recommendations to users. The data structures may be updated or recalculated on a periodic basis by a data process scheduler executed by CPU 204. File and user metadata may be changed by recent user actions, so data structures based on the metadata are recalculated to account for those recent actions. CPU 204 may load some data structures to RAM 208, e.g. a data cache, while CPU 204 processes requests to provide a scored list of applications. The data cache allows CPU 204 to reference recently used data and is periodically refreshed.

Client computer 216 includes a CPU 224, ROM 220, RAM 222, input/output interface 218, and bus 226. Client computer 216 may have additional components that are not illustrated in FIG. 2. Bus 226 allows the various components of client computer 216 to communicate with each other. Input/output interface 218 allows client computer 216 to communicate with other devices, such as cloud computing service 202. Input/output interface 218 also includes devices for taking in user inputs and displaying outputs to a user, such as a keyboard, mouse, and display screen. CPU 224 executes various programs stored in memory on client computer 216, such as a web browser. Web browsers are used, among other things, to display a user interface provided by cloud computing service 202 for viewing and editing files. Web browsers receive web page documents encoded in HTML, CSS, or other web-compatible languages and interpret the language to properly display the web page.

Data store 212 for storing files, applications, and data structures on cloud computing service 202, a web browser executing on client computer 216, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

A cloud computing service has a large base of users and available applications, and is capable of collecting aggregate data concerning the installation and usage of applications by users. This data are statistically significant and may be harnessed to generate application recommendations for a particular user. There are many ways the combination of data about users, files, and applications may be used in an application recommendation scheme. For example, recommendations may be based on the most frequently downloaded applications by all users, or the most frequently downloaded applications given a set of applications that the user has currently installed. In another example, recommendations for applications to open a target file may be based on which applications have most frequently been used to open the file type of the target file. In another example, recommendations may be based on which applications can open files that are of importance to a user. In another example, users that have similar application usage characteristics to the target user may be identified, and applications that similar users frequently use may be recommended to the target user. Recommendations may also be based on a combination of one or more of the above-identified methods as well as other methods for recommending applications.

Various methods of generating scored lists of applications for recommendation to a user are further described in the following co-pending applications: U.S. patent application Ser. No. 14/040,772, entitled "SYSTEMS AND METHODS FOR DETERMINING APPLICATION INSTALLATION LIKELIHOOD BASED ON INSTALLATION CHARACTERISTICS," which is hereby incorporated by reference herein in its entirety; U.S. patent application Ser. No. 14/040,775, entitled "SYSTEMS AND METHODS FOR DETERMINING APPLICATION INSTALLATION LIKELIHOOD BASED ON FILE TYPE CHARACTERISTICS," which is hereby incorporated by reference herein in its entirety; U.S. patent application Ser. No. 14/040,779, entitled "SYSTEMS AND METHODS FOR DETERMINING APPLICATION INSTALLATION LIKELIHOOD BASED ON USER FILE TYPE DISTRIBUTION," which is hereby incorporated by reference herein in its entirety; and U.S. patent application Ser. No. 14/040,780, entitled "SYSTEMS AND METHODS FOR DETERMINING APPLICATION INSTALLATION LIKELIHOOD BASED ON USER NETWORK CHARACTERISTICS," which is hereby incorporated by reference herein in its entirety.

A cloud computing service may have multiple independent scorer units, each of which implement one of the recommendation methods described above or other known recommendation methods. The independent scorers each output a scored list of applications from the set of available applications provided by the cloud computing service. Table 300 in FIG. 3 shows an example of the output of three independent scorers evaluating five applications. The score of an application is a measure of the likely relevance of the application to the user. A higher score means that the application should be more strongly recommended to the user according to the scoring methodology used by the independent scorer. Thus in table 300, independent Scorer 1 would recommend App C the most, independent Scorer 2 would recommend App E the most, and independent Scorer 3 would recommend App E the most.

Each scorer takes as input various data stored by the cloud computing service in order to generate the score. This data may come from file metadata, application metadata, information about users of the cloud computing service, or special data structures derived from the file metadata, application metadata, and user information. For example, an application configuration database accessible by the cloud computing service stores the file types that each application provided by the cloud computing service can open. This information may be used by one or more independent scorers to calculate scores. In another example, the file metadata may contain the file type of the file and how many times each user has used each application to open the file. This information may be used by one or more independent scorers to calculate scores. Specialized data structures may be created from this metadata as well. For example, the cloud computing service may use the file metadata to create an application signature for each user which describes the application usage behavior for each user. The application signature may be used by one or more independent scorers to calculate scores.

The client computing service may rely solely on a particular independent scorer to recommend applications to a user. However, in some cases more accurate recommendations may be made by combining the results of multiple independent scorers in order to make recommendations based on a variety of data. A composite scored list of applications may be created from the scored list of applications outputted by each independent scorer. However, as seen from table 300, the scores from each independent scorer may have different scales. For example, the non-zero scores for Scorer 1 range from 38 to 1,423 while the non-zero scores for Scorer 2 range from 0.1 to 0.4. If a composite score is calculated by simply adding the scores from each scorer, Scorer 1 would have a disproportionally high amount of influence over the composite score because of its higher numerical range.

A way to mitigate inequitable scoring scales is to normalize the scores for each scored list of applications outputted by the independent scorers. Normalization forces the scores to be on the same scale. One way to normalize a scored list of applications is to divide each score by the sum of the scores. The result is normalized scores ranging between 0 and 1, where the sum of the normalized scores is also 1. Another way to normalize the scored list is to divide each score by the highest score in the list, which results in scores that range between 0 and 1 but do not sum to 1. Normalization still preserves the relative difference between the scores. Table 400 in FIG. 4 shows the normalized version of the scored list of applications found in FIG. 3. All the scored lists of applications range from 0 to 1. The scores from different independent scorers may now be compared directly to each other.

Figure 5:
FIG. 5 shows an example of a scorer weight table in accordance with an implementation as described herein.

A composite score for an application may simply be the sum of the normalized scores of the application from each independent scorer. However, the cloud computing service may want to weight certain independent scorers more strongly than other independent scorers, i.e. have certain independent scorers influence the composite score to a greater degree. Thus the cloud computing service may assign a weight to each scorer. FIG. 5 shows a scorer weight table 500 that is stored by the cloud computing service. Scorer weight table 500 assigns a weighting value to each scorer. The weighting values may be normalized such that the sum of the weighting values adds to 1. The weighting values may be subject to a feedback loop from the cloud computing service. Information about which applications a user selects from the applications recommended to the user may be used to adjust or optimize the weighting values. This feedback loop is discussed in more detail further herein.

Figure 6:
FIG. 6 shows an example of a composite scored list of applications in accordance with an implementation as described herein.

A composite score for an application may now be generated using the normalized scores from each independent scorer and the weighting values for each scorer. FIG. 6 shows a composite scored list of applications 600 derived from the normalized scored list of applications in FIG. 4 and the scorer weighting table in FIG. 5. Composite scored list 600 may be a table with the application IDs of each application provided by the cloud computing service and its corresponding composite score. The composite score for an application may be expressed as $$score=(IS_1*W_1+IS_2*W_2+\ldots+IS_N*W_N)/(W_1+W_2+\ldots+W_N)$$

where N is the number of independent scorers, $IS_n$ is the normalized score of the application from the n-th independent scorer, and $W_n$ is the weighting value assigned to the n-th independent scorer. However, there may be other methods to calculate a composite score from the independent scorers and the weighting values. If every scored list of applications has been normalized and the weighting values have also been normalized, the composite scored list is also normalized so that the sum of all the composite scores is 1. The composite scored list of applications may be used by the cloud computing service to recommend applications to a user. The composite scored list of applications may be unsorted or may be sorted based on composite score, application ID, or some other sorting basis.

Figure 7:
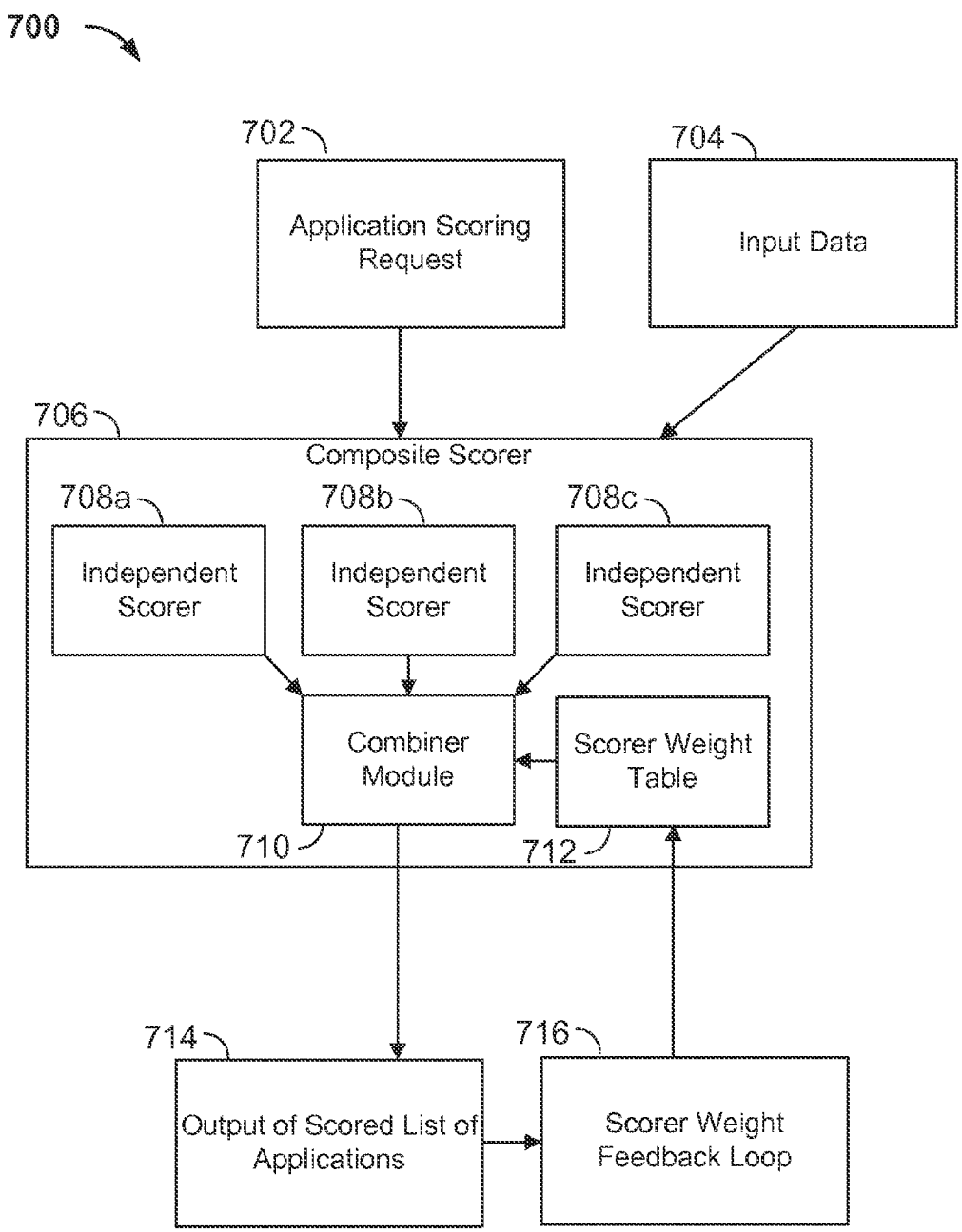
FIG. 7 shows a scorer unit for generating a scored list of applications in accordance with an implementation as described herein.

The cloud computing service has a composite scorer unit that creates a composite scored list of applications from the output of one or more independent scorers. This composite list may be used by the cloud computing service to recommend one or more applications to a user. FIG. 7 shows an example flow chart 700 of a composite scorer unit operated by the cloud computing service. The process flow for the scorer unit illustrated in FIG. 7 may be summarized below:

1. Receive request to score applications and a set of input data.
2. Initiate one or more independent scorers to calculate a scored list of applications, and send each independent scorer any required data from the set of input data.
3. Normalize the outputted scored list of applications from each independent scorer.
4. Construct the composite scored list of applications from the normalized scored lists of applications and the scorer weight table.
5. Output scored list of applications.
6. (Optional) Use a feedback loop to adjust the scorer weight table based on the user choices.

The composite scorer unit is part of the cloud computing service and executes the above process flow each time a request is received to score applications. The process flow above is an example and additional tasks may be done by the composite scorer unit. For example, the composite scorer unit may sort the composite scored list of applications before outputting it. The composite scorer unit is initiated when an application scoring request is received, shown at 702. The scoring request may be triggered by a user action on the cloud computing user interface. For example, the scoring request may be initiated when a user logs into the cloud computing service or when the user navigates to an application selection or application browsing screen. The scoring request may also be initiated when a user selects a target file and seeks an application to open the target file, such as with an "Open With" or "Preview" command. These actions provide opportunities for the cloud computing service to display recommended applications to a user.

The composite scorer unit also receives input data 704 along with application scoring request 702. Each independent scorer may use a portion of input data 704 to generate scores for each application. Input data 704 may include file metadata, application metadata from an application configuration database, data about users, and specially created data structures based on the file, application, and user data. Once the application scoring request and input data are received, the composite scorer unit initiates a composite scoring routine, shown at 706. The composite scoring routine initiates one or more independent scorers, shown in FIG. 7 as scorers 708a through 708c. Composite scoring routine 706 passes portions of input data 704 to each independent scorer as necessary for the independent scorer to calculate its score. For example, input data 704 may include the file type of each file accessible to the user. Independent scorer 708a may require the file types of files accessible by the user to generate scores, and the composite scoring routine 706 passes this information to independent scorer 708a. There may be a number of independent scorers available and composite scoring routine 706 may initiate only a subset of them. The independent scorers that composite scoring routine 706 initiates may be determined from the application scoring request, or may be determined by which data is received in data input 704, or may be set by default.

The output of each independent scorer is a scored list of applications, which are passed on combiner module 710. Combiner module 710 combines the individual scored lists into one composite scored list of applications. Combiner module 710 normalizes each scored list before combining them, and may also apply weighting values to each list based on scorer weight table 712. For example, the composite score for an application may be expressed as $$score=(IS_1*W_1+IS_2*W_2+\ldots+IS_N*W_N)/(W_1+W_2+\ldots+W_N)$$

where N is the number of independent scorers, $IS_n$ is the normalized score of the application from the n-th independent scorer, and $W_n$ is the weighting value assigned to the n-th independent scorer. The composite scored list of applications is then a table of application IDs and the composite score for each application. The scored list of applications is the output of the composite scorer unit, shown at 714. The scored list of applications may be sorted by score, by application ID, or by any other sorting method, or may be unsorted. The cloud computing service uses the outputted list to generate application recommendations for the user.

The composite scorer unit may also have a scorer weight feedback loop 716. Scorer weight feedback loop 716 stores any actions taken by the user given a set of recommended applications provided by the composite scorer unit. For example, a result score may be assigned to a user's choice of recommended applications. If the user selects the top ranked recommended application, the result score may be 1. If the user selects the third ranked recommended application, the result score may be 3. The result scores of every user of the cloud computing service over a period of time may be averaged together to form a composite result score. A lower score indicates that users are selecting applications that are highly recommended by the cloud computing service, while a higher score indicates that users are selecting applications that are not highly recommended. Information regarding whether users disregard the application recommendations may also be stored.

The composite result score calculated by scorer weight feedback loop 716 may be used to change the weighting values of each scorer in scorer weight table 712. For example, the weighting value of each scorer may be perturbed randomly or in a principled search scheme and the composite result score for different weighting combinations are compared. Weighting combinations with lower composite result scores indicate a more effective balance of the influence of each independent scorer on the composite score. This allows the composite scorer unit to optimize the weighting values so that the composite scored list of applications more closely aligns with users' actual preferred applications. Other methods of incorporating feedback loops to the scorer weights may also be used by composite scorer unit 700.

Figure 8:
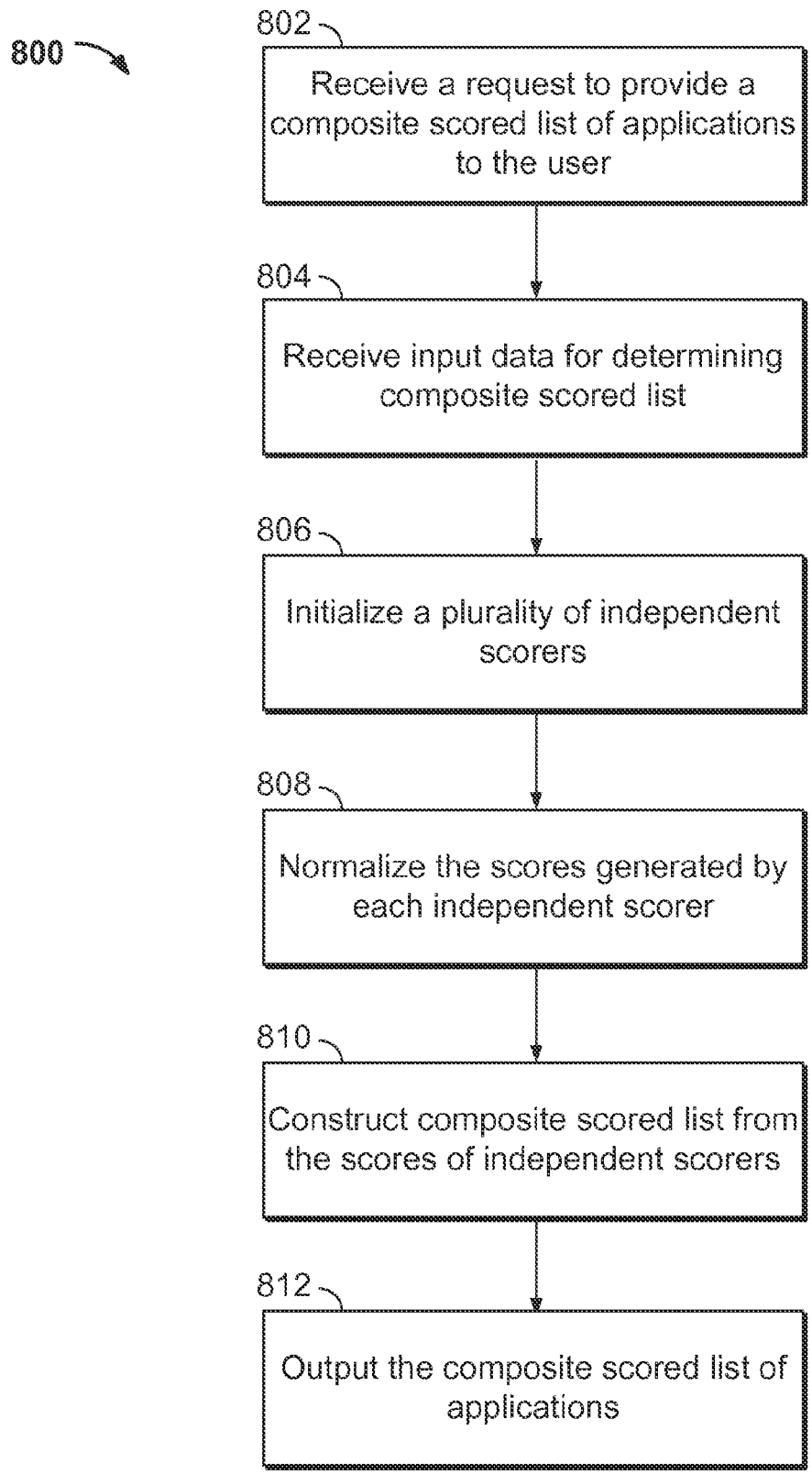
FIG. 8 shows a method for providing recommendations for applications to a user in accordance with an implementation as described herein.

Methods for providing recommendations for applications to a user are now described. Method 800 illustrated in FIG. 8 shows a method for providing a scored list of applications for use in recommending applications to a user, which includes receiving at a cloud computing service a request to provide a composite scored list of applications for a user, where the cloud computing service provides a set of available applications to each user of the cloud computing service, and receiving input data for determining the composite scored list of applications. The method further includes initializing a plurality of independent scorers, where each independent scorer takes as input a portion of the input data and outputs a scored list of applications for the set of available applications, and normalizing the scored list of applications outputted by each independent scorer. The method further includes constructing the composite scored list of applications, where the composite scored list of applications is a function of the normalized scored list of applications outputted by each independent scorer and a weighting value assigned to each independent scorer, and outputting the composite scored list of applications. Method 800 may be performed on one or more servers that provide a cloud computing service, such as cloud computing service 102 in FIG. 1 or cloud computing service 202 in FIG. 2. Specifically, a composite scorer unit within the cloud computing service, such as shown in FIG. 7, may perform all or a portion of method 800.

Method 800 begins when the cloud computing service receives a request to provide a composite scored list of applications to a user, shown at 802. The composite scored list of applications may be used to generate a set of recommended applications to show the user. The request may be triggered by certain user actions on the user interface provided by the cloud computing service. For example, the request may be triggered when the user logs into the cloud computing service on the user's client computer, or when the user navigates to an application selection or application browsing page on the user interface. The scoring request may also be initiated when a user selects a target file and seeks an application to open the target file, such as with an "Open With" or "Preview" command. The cloud computing service also receives input data along with the request to provide a composite scored list of applications, shown at 804. The input data is used to determine the composite scored list of applications. The input data may include file metadata for each file stored on the cloud computing service, application metadata for each application in the set of available applications, information about each user of the cloud computing service, and one or more data structures based on data about the files, applications, and users.

After the cloud computing service receives the request and the input data, the cloud computing service initiates a plurality of independent scorers, shown at 806. Each independent scorer takes as input a portion of the input data. For example, one independent scorer may take as input file metadata for each file stored on the cloud computing service while another independent score takes as input information about each user of the cloud computing service and application metadata for each application in the set of available applications. Each independent scorer outputs a scored list of applications, where the score is calculated using a variety of mechanisms. For example, one independent scorer outputs a scored list of applications based on application installation characteristics of each user of the cloud computing service. Another independent scorer outputs a scored list of applications based on application usage characteristics of each user of the cloud computing service. Yet another independent scorer outputs a scored list of applications based on the file types of files stored on the cloud computing service and accessible to the user. Yet another independent scorer outputs a scored list of applications based on the importance of files accessible to the user.

After the plurality of independent scorers each output a scored list of applications, the cloud computing service normalizes each scored list, shown at 808. For example, the scores of each scored list may be normalized to range from 0 to 1 by dividing each score by the sum of the scores in the list, or by dividing each score by the highest score in the list. Normalization of the scores allows the scored list of applications to be combined directly without any one independent scorer having inordinate and unintentional influence over the composite scored list of applications. The normalized scored lists of applications are then compiled into a composite scored list of applications, shown at 810. The cloud computing service stores a scorer weight table that associates each independent scorer with a weighting value. The weighting value balances the relative influence each independent scorer has over the composite scored list of applications. One way of calculating a composite score for an application may be expressed as $$\text{score} = (IS_1 \ast W_1 + IS_2 \ast W_2 + \ldots + IS_N \ast W_N)/(W_1 + W_2 + \ldots + W_N)$$

where N is the number of independent scorers, $IS_n$ is the normalized score of the application from the n-th independent scorer, and $W_n$ is the weighting value assigned to the n-th independent scorer.

The weighting values may be adjusted using a feedback loop. The cloud computing service recommends applications to its users, and the feedback loop is a function of the applications that the users selected from the recommended applications. Each time a user selects an application from a set of recommended applications provided by the cloud computing service, a result score is assigned to the choice. The result scores of many user choices are averaged into a composite result score. The cloud computing service may vary the weighting combinations and compare the composite result score of each to determine which weighting combinations are more effective at recommending applications that users actually select.

The composite scored list of applications may be unsorted or sorted by score, application ID, or some other sorting basis. The composite scored list of applications is then outputted, shown at 812. The outputted list is used by the cloud computing service to recommend one or more applications to the user. In this manner, a cloud computing service provides a composite scored list of applications for use in recommending applications to a user.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing recommendations for applications to a user, the method comprising:
   receiving at a cloud computing service a request to provide a composite scored list of applications for a user, wherein the cloud computing service provides a predetermined set of available applications to each user of the cloud computing service;
   receiving input data for determining the composite scored list of applications;
   initializing a plurality of independent scorers, wherein each independent scorer takes as input a portion of the input data and outputs a scored list of applications in the predetermined set of available applications;
   normalizing the scored list of applications outputted by each independent scorer;
   constructing the composite scored list of applications, wherein the composite scored list of applications is a function of the normalized scored list of applications outputted by each independent scorer and a weighting value assigned to each independent scorer, and wherein a composite score for a first application in the predetermined set of available applications is calculated as:

$$(IS_1*W_1+IS_2*W_2+\ldots+IS_N*W_N)/(W_1+W_2+\ldots+W_N)$$

where N is a number of independent scorers, $IS_n$ is a normalized score of the first application from the n-th independent scorer, and $W_n$ is the weighting value assigned to the n-th independent scorer; and
   outputting the composite scored list of applications.

2. The method of claim 1, wherein the composite scored list of applications is sorted by the score of each application.

3. The method of claim 1, wherein each application in the composite scored list of applications is identified by an application ID.

4. The method of claim 1, wherein the weighting values assigned to each independent scorer are normalized such that a summation of the weighting values equals one.

5. The method of claim 1, the method further comprising adjusting the weighting value assigned to each independent scorer based on a feedback loop from the users of the cloud computing service, wherein the adjusting is based on a rank of each application in the composite scored list of applications.

6. The method of claim 5, wherein the cloud computing service recommends applications to users and the feedback loop is a function of the applications that the users select from the recommended applications, and the ranks of the applications that the users select are stored as result scores, each result score representing a relative success of the recommended application.

7. The method of claim 1, wherein the input data comprises at least one of file metadata for each file stored on the cloud computing service, application metadata for each application in the predetermined set of available applications, and information about each user of the cloud computing service.

8. The method of claim 1, wherein a first independent scorer in the plurality of independent scorers outputs a first scored list of applications based on application installation characteristics of each user of the cloud computing service,
   the user has not installed a first application in the predetermined set of applications,
   a plurality of other users have applications installed that are similar to applications that are installed by the user, and
   the application installation characteristics for the user are indicative of a frequency that the first application is installed by the plurality of other users.

9. The method of claim 1, wherein a first independent scorer in the plurality of independent scorers outputs a first scored list of applications based on application usage characteristics of each user of the cloud computing service.

10. The method of claim 1, wherein a first independent scorer in the plurality of independent scorers outputs a first scored list of applications based on the file types of files stored on the cloud computing service and accessible to the user.

11. The method of claim 1, wherein a first independent scorer in the plurality of independent scorers outputs a first scored list of applications based on the importance of files accessible to the user.

12. An apparatus for providing recommendations for applications to a user, the apparatus comprising:
   a server configured to:
      communicate with the plurality of client computers;
      receive from a first client computer in the plurality of client computers a request to provide a composite scored list of applications for a user, wherein the server provides a predetermined set of available applications to each user of the server;
      receive input data for determining the composite scored list of applications;
      initialize a plurality of independent scorers, wherein each independent scorer takes as input a portion of the input data and outputs a scored list of applications in the predetermined set of available applications;
      normalize the scored list of applications outputted by each independent scorer;
      construct the composite scored list of applications, wherein the composite scored list of applications is a function of the normalized scored list of applications outputted by each independent scorer and a weighting value assigned to each independent scorer, and wherein a composite score for a first application in the predetermined set of available applications is calculated as:

$$(IS_1*W_1+IS_2*W_2+ \ldots +IS_N*W_N)/(W_1+W_2+ \ldots +W_N)$$

where N is a number of independent scorers, $IS_n$ is a normalized score of the first application from the n-th independent scorer, and $W_n$ is the weighting value assigned to the n-th independent scorer; and output the composite scored list of applications.

13. The apparatus of claim 12, wherein the composite scored list of applications is sorted by the score of each application.

14. The apparatus of claim 12, wherein each application in the composite scored list of applications is identified by an application ID.

15. The apparatus of claim 12, wherein the server is further configured to normalize the weighting values assigned to each independent scorer such that a summation of the weighting values equals one.

16. The apparatus of claim 12, the wherein the server is further configured to:
provide each user with a set of recommended applications;
assign a result score when each user selects an application from the set of recommended applications; and
adjust the weighting value assigned to each independent scorer based on the average of the result scores from each user.

17. The apparatus of claim 12, wherein the input data comprises at least one of file metadata for each file stored on the server, application metadata for each application in the predetermined set of available applications, and information about each user of the server.

18. The apparatus of claim 12, wherein a first independent scorer in the plurality of independent scorers outputs a first scored list of applications based on application installation characteristics of each user of the server,
the user has not installed a first application in the predetermined set of applications,
a plurality of other users have applications installed that are similar to applications that are installed by the user, and
the application installation characteristics for the user are indicative of a frequency that the first application is installed by the plurality of other users.

19. The apparatus of claim 12, wherein a first independent scorer in the plurality of independent scorers outputs a first scored list of applications based on application usage characteristics of each user of the server.

20. The apparatus of claim 12, wherein a first independent scorer in the plurality of independent scorers outputs a first scored list of applications based on the file types of files stored on the server and accessible to the user.

21. The apparatus of claim 12, wherein a first independent scorer in the plurality of independent scorers outputs a first scored list of applications based on the importance of files to the user.

22. A non-transitory computer readable medium storing computer-executable instructions, which, when executed by a processor, cause the processor to carry out a method for providing a scored list of applications for use in recommending applications to a user, wherein the instructions comprise:
instructions to receive at a cloud computing service a request to provide a composite scored list of applications for a user, wherein the cloud computing service provides a predetermined set of available applications to each user of the cloud computing service;
instructions to receive input data for determining the composite scored list of applications;
instructions to initialize a plurality of independent scorers, wherein each independent scorer takes as input a portion of the input data and outputs a scored list of applications in the predetermined set of available applications;
instructions to normalize the scored list of applications outputted by each independent scorer by a sum of the scores of the applications in the scored list of applications;
instructions to construct the composite scored list of applications, wherein the composite scored list of applications is a function of the normalized scored list of applications outputted by each independent scorer and a weighting value assigned to each independent scorer, and wherein a composite score for a first application in the predetermined set of available applications is calculated as:

$$(IS_1*W_1+IS_2*W_2+ \ldots +IS_N*W_N)/(W_1+W_2+ \ldots +W_N)$$

where N is a number of independent scorers, $IS_n$ is a normalized score of the first application from the n-th independent scorer, and $W_n$ is the weighting value assigned to the n-th independent scorer; and instructions to output the composite scored list of applications.

23. The non-transitory computer readable medium of claim 22, wherein the instructions further include instructions to sort the composite scored list of applications by the score of each application.

24. The non-transitory computer readable medium of claim 22, wherein the instructions further include instructions to normalize the weighting values assigned to each independent scorer by the sum of the scorer such that a summation of the weighting values equals one.

25. The non-transitory computer readable medium of claim 22, wherein the instructions further include instructions to adjust the weighting value assigned to each independent scorer based on a feedback loop from the users of the cloud computing service, wherein the feedback loop is based on a rank of each application in the composite scored list of applications.

26. The non-transitory computer readable medium of claim 25, wherein the cloud computing service recommends applications to users and the feedback loop is a function of the applications that the users select from the recommended applications, and the ranks of the applications that the users select are stored as result scores, each result score representing a relative success of the recommended application.

27. The non-transitory computer readable medium of claim 22, wherein the input data comprises at least one of file metadata for each file stored on the cloud computing service, application metadata for each application in the set of available applications, and information about each user of the cloud computing service.

28. The non-transitory computer readable medium of claim 22, wherein a first independent scorer in the plurality of independent scorers outputs a first scored list of applications based on application installation characteristics of each user of the cloud computing service,
the user has not installed a first application in the predetermined set of applications,
a plurality of other users have applications installed that are similar to applications that are installed by the user, and the application installation characteristics for the user are indicative of a frequency that the first application is installed by the plurality of other users.

29. The non-transitory computer readable medium of claim 22, wherein a first independent scorer in the plurality of independent scorers outputs a first scored list of applications based on application usage characteristics of each user of the cloud computing service.

30. The non-transitory computer readable medium of claim 22, wherein a first independent scorer in the plurality of independent scorers outputs a first scored list of applications based on the file types of files stored on the cloud computing service and accessible to the user.

31. The non-transitory computer readable medium of claim 22, wherein a first independent scorer in the plurality of independent scorers outputs a first scored list of applications based on the importance of files to the user.

32. A system for providing recommendations for applications to a user, the system comprising:
a plurality of client computers; and
a server configured to:
communicate with the plurality of client computers;
receive from a first client computer in the plurality of client computers a request to provide a composite scored list of applications for a user, wherein the server provides a predetermined set of available applications to each user of the server;
receive input data for determining the composite scored list of applications;
initialize a plurality of independent scorers, wherein each independent scorer takes as input a portion of the input data and outputs a scored list of applications in for the predetermined set of available applications;
normalize the scored list of applications outputted by each independent scorer;
construct the composite scored list of applications, wherein the composite scored list of applications is a function of the normalized scored list of applications outputted by each independent scorer and a weighting value assigned to each independent scorer, and wherein a composite score for a first application in the predetermined set of available applications is calculated as:

$$(IS_1*W_1+IS_2*W_2+\ldots+IS_N*W_N)/(W_1+W_2+\ldots+W_N)$$

where N is a number of independent scorers, $IS_n$ is a normalized score of the first application from the n-th independent scorer, and $W_n$ is the weighting value assigned to the n-th independent scorer; and
output the composite scored list of applications.

* * * * *